United States Patent
Francis et al.

(10) Patent No.: US 10,417,119 B2
(45) Date of Patent: Sep. 17, 2019

(54) DYNAMIC TESTING BASED ON AUTOMATED IMPACT ANALYSIS

(71) Applicants: Sachin Francis, Kerala (IN); Divya Gupta, Jaipur (IN); Ayush Datta, Noida (IN); Vijay Thomas, Aluva (IN)

(72) Inventors: Sachin Francis, Kerala (IN); Divya Gupta, Jaipur (IN); Ayush Datta, Noida (IN); Vijay Thomas, Aluva (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/141,477

(22) Filed: Apr. 28, 2016

(65) Prior Publication Data

US 2017/0262361 A1  Sep. 14, 2017

(51) Int. Cl.
G06F 11/36  (2006.01)

(52) U.S. Cl.
CPC ........ G06F 11/3688 (2013.01); G06F 11/368 (2013.01); G06F 11/3692 (2013.01)

(58) Field of Classification Search
CPC . G06F 11/3688; G06F 11/3692; G06F 11/368
See application file for complete search history.

(56) References Cited

U.S. PATENT DOCUMENTS

| | | | | |
|---|---|---|---|---|
| 2008/0148247 A1* | 6/2008 | Galler | .................. | G06F 11/3684 717/154 |
| 2014/0380279 A1* | 12/2014 | Bartley | ............... | G06F 11/3676 717/124 |
| 2015/0082090 A1* | 3/2015 | Holden | ............... | G06F 11/2294 714/25 |
| 2015/0169432 A1* | 6/2015 | Sinyagin | ............. | G06F 11/3684 717/124 |

OTHER PUBLICATIONS

A. Avritzer and E.J. Weyuker, "The Automatic Generation of Load Test Suites and the Assessment of the Resulting Software", IEEE Trans. Software Eng., vol. 21, No. 9, pp. 705-716, Sep. 1995.

M. Balcer, W. Hasling, and T. Ostrand, "Automatic Generation of Test Scripts" from Formal Test Specifications, Proc. Third Symp. Software Testing, Analysis, and Verification, pp. 210-218, Dec. 1989.

T. Gyimothy, A. Beszedes, and I. Forgacs. "An efficient relevant slicing method for debugging", ACM/SIGSOFT Foundations of Software Engineering, pp. 303-321, 1999.

* cited by examiner

*Primary Examiner* — Wei Y Zhen
*Assistant Examiner* — Amir Soltanzadeh
(74) *Attorney, Agent, or Firm* — Ferguson Braswell Fraser Kubasta PC

(57) ABSTRACT

A method for automated software testing may include mapping test cases to lines in files in a codebase. Each test case covers one or more lines in one or more files and has corresponding test results. The method may further include obtaining a change list including one or more changes. Each change specifies a changed line in a changed file. The method may further include determining impacted test cases, based on the mapping and the change list, prioritizing the impacted test cases based, in part, on test results corresponding to each impacted test case, executing, based on the prioritization, one or more impacted test cases to obtain executed test cases, and obtaining, for each executed test case, new test results.

18 Claims, 6 Drawing Sheets

DYNAMIC TESTING BASED ON AUTOMATED IMPACT ANALYSIS

CROSS-REFERENCE TO RELATED APPLICATIONS

This non-provisional patent application claims priority to Indian Patent Application No. 201631008602, filed on Mar. 11, 2016 in the Indian Intellectual Property Office, under 35 U.S.C. § 119(a). The entire contents of Indian Patent Application No. 201631008602 are hereby incorporated by reference.

BACKGROUND

Modern software development methods such as continuous integration involve frequent testing of an evolving codebase. Quick testing, focused on the portions of the codebase most likely to fail is needed to detect as many bugs as possible early in the software development/integration cycle. Bugs detected late in the software development/integration cycle may often be more difficult and time-consuming to fix.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for automated software testing including mapping test cases to lines in files in a codebase. Each test case covers one or more lines in one or more files and has corresponding test results. The method further includes obtaining a change list including one or more changes. Each change specifies a changed line in a changed file. The method further includes determining impacted test cases, based on the mapping and the change list, prioritizing the impacted test cases based, in part, on test results corresponding to each impacted test case, executing, based on the prioritization, one or more impacted test cases to obtain executed test cases, and obtaining, for each executed test case, new test results.

In general, in one aspect, one or more embodiments relate to a system including mapper circuitry configured for mapping test cases to lines in files in a codebase. Each test case covers one or more lines in one or more files and has corresponding test results. The system further includes change list analyzer circuitry configured for obtaining a change list including one or more changes. Each change specifies a changed line in a changed file. The change list analyzer circuitry is further configured for determining impacted test cases, based on the mapping and the change list. The system further includes test sequencer circuitry configured for prioritizing the plurality of impacted test cases based, in part, on test results corresponding to each impacted test case. The system further includes test executive circuitry configured for executing, based on the prioritization, one or more impacted test cases to obtain executed test cases and obtaining, for each executed test case, new test results. The system further includes repository circuitry configured for storing at least the codebase and the test cases.

In general, in one aspect, one or more embodiments of the invention relate to a non-transitory computer readable medium including instructions that, when executed by a processor, perform a method for automated software testing including mapping test cases to lines in files in a codebase. Each test case covers one or more lines in one or more files and has corresponding test results. The method further includes obtaining a change list including one or more changes. Each change specifies a changed line in a changed file. The method further includes determining impacted test cases, based on the mapping and the change list, prioritizing the impacted test cases based, in part, on test results corresponding to each impacted test case, executing, based on the prioritization, one or more impacted test cases to obtain executed test cases, and obtaining, for each executed test case, new test results.

Other aspects of the invention will be apparent from the following description and the appended claims.

DETAILED DESCRIPTION

Figure 1:
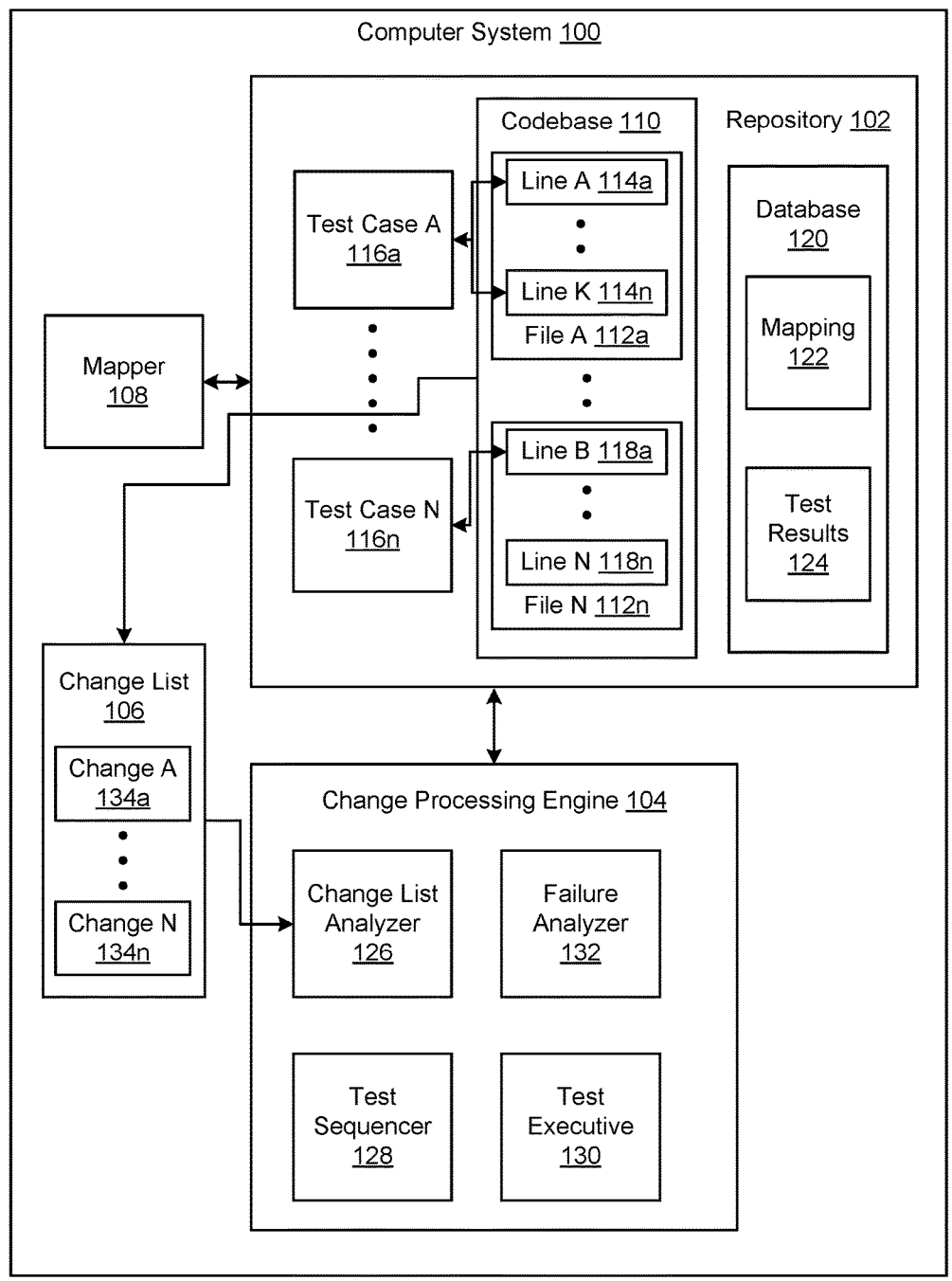
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for automated software testing. In particular, one or more embodiments are directed to a method that uses a mapping of test cases to portions of a codebase covered by those test cases, and a change list representing the difference between versions of a codebase, to determine and prioritize the test cases impacted by changes to the codebase. In one or more embodiments, the prioritization of impacted test cases may be based on a continuously updated database of test results, incorporating the knowledge gained from previous testing, including execution time and failure history. This enables focused testing on quick-running test cases covering portions of the codebase that are likely to fail and thus aid in the early detection of bugs, and streamline continuous integration. In one or more embodiments, alerts may be issued identifying potential trouble spots in the codebase based on test results. In one or more embodiments, the prioritization of impacted test cases may also be based on the precision of coverage of these impacted test cases relative to the changes in the change list.

FIG. 1 shows a system in accordance with one or more embodiments of the invention. As shown in FIG. 1, the system includes a computer system (100) that includes a repository (102), a change processing engine (104), a change list (106), and a mapper (108). In one or more embodiments, the computer system (100) may be the computing system (600) described with respect to FIG. 6A or may be the client device (626) described with respect to FIG. 6B and the accompanying description below. Alternatively, the computer system (100) may be any computing device, such as a smart phone, a tablet, a laptop computer, a desktop computer, etc.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. In one or more embodiments, the repository (102) includes a codebase (110), a collection of test cases (116a-116n), and a database (120). In one or more embodiments of the invention, the codebase (110) is a collection of source code including various software applications and/or components. That is, the codebase (110) may be a collection of computer instructions written in a human-readable programming language. The codebase (110) may be transformed by a compiler program into binary machine code. Compiled machine code may then be executed by a processor in order to execute the applications and/or components generated from the codebase (110).

In one or more embodiments of the invention, the codebase (110) may be divided into a collection of files (112a-112n), where each file (112a-112n) may in turn be divided into a collection of lines (114a-114n, 118a-118n). Each file (112a-112n) may be identified by a filename, and each line (114a-114n, 118a-118n) may be identified by a line number and a filename, where the line number specifies the location of the line (114a-114n, 118a-118n) within its containing file (112a-112n). In one or more embodiments, a file (112a-112n) corresponds to a class or some other logical division of the codebase (110). In one or more embodiments, the codebase (110) may be divided into additional hierarchical units beyond files (112a-112n) and lines (114a-114n, 118a-118n). For example, a file (112a-112n) may be divided into one or more functions and/or data structures, each of which in turn may be divided into one or more lines (114a-114n, 118a-118n).

In one or more embodiments, a line (114a-114n, 118a-118n) may include a string of characters followed by a line separator, where the string of characters may have a predetermined maximum length. In one or more embodiments, a line (114a-114n, 118a-118n) may correspond to one or more computer instructions, or may correspond to a portion of a computer instruction.

In one or more embodiments, the repository includes functionality to store multiple versions of the codebase (110), the collection of test cases (116a-116n), and the database (120). In one or more embodiments, the difference between successive versions of the codebase (110) may be represented as a change list (106). In one or more embodiments, the change list (106) may be received from a version control system (e.g., GitHub) that maintains multiple versions of the source code of the codebase (110). For example, a version control system may provide a change list (106) identifying a set of changes (134a-134n) made in a commit operation that creates a new version of the codebase (110). In one or more embodiments, a change (134a-134n) in the change list (106) may specify one or more changed lines (114a-114n, 118a-118n) in a changed file (112a-112n).

In one or more embodiments, the codebase (110) may be tested using a collection of test cases (116a-116n). For example, a test case (116a-116n) may exercise portions of the codebase using a range of inputs and settings in order to assess the performance of the codebase under a range of scenarios, in order to identify errors or deviations from the desired performance of the codebase (110). In one or more embodiments, a test case (116a-116n) may be a collection of computer instructions written in a human-readable programming language. A test case (116a-116n) may be transformed by a compiler program into binary machine code. Compiled machine code may then be executed by a processor in order to execute the test case (116a-116n).

In one or more embodiments of the invention, the database (120) is a collection of information configured for ease of data retrieval, modification, re-organization, and deletion. In one or more embodiments, the database (120) may be accessed via a Database Management System (DBMS), which is a software application that provides an interface for users to define, create, query, update, or administer databases. The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

In one or more embodiments, the mapper (108) generates a mapping (122), stored in the database (120), specifying the portion of the codebase (110) covered by each test case (116a-116n). In one or more embodiments, input to the mapper (108) may be based on the output of a code coverage tool. For example, during debugging, the Java Virtual Machine permits extraction of source code line numbers corresponding to executable code (e.g., corresponding to an executed test case (116a-116n)). In some embodiments, the mapping (122) may specify that a test case (116a-116n) covers one or more lines (114a-114n, 118a-118n) within one or more files (112a-112n).

In one or more embodiments, a line (114a-114n, 118a-118n) in a file (112a-112n) may be covered by multiple test cases (116a-116n). Mapping test cases (116a-116n) against the codebase (110) may be a periodic process, and may result in updating the mapping (122) as the codebase (110) is changed. In one or more embodiments, the mapping (122)

may be updated when test cases (116a-116n) are added, revised or deleted. In one or more embodiments, executing some or all of the test cases (116a-116n) on the codebase (110) may be performed at periodic (e.g., weekly or monthly) intervals, depending on the extent of the changes to the codebase (110). In one or more embodiments, depending on the value of a flag, the mapping (122) may be updated in the database (120) when test cases (116a-116n) are executed. In one or more embodiments, updating the mapping (122) in the database (120) may proceed without receiving a change list (106).

In one or more embodiments, the database (120) may include a collection of test results (124) obtained from executing test cases (116a-116n). In one or more embodiments, the collection of test results (124) may include the execution time of the test case (116a-116n). In one or more embodiments, the execution time may be an average execution time based on multiple executions of the test case (116a-116n). In one or more embodiments, the collection of test results may include a failure count of the test case (116a-116n), indicating the number of times the test case (116a-116n) has failed when executed on the codebase (110). In one or more embodiments, the collection of test results may also include a variety of measures of resource utilization (e.g., processor and/or memory utilization) during the execution of the test case (116a-116n). The collection of test results (124) represents the knowledge learned from executing test cases (116a-116n) which may be useful during subsequent prioritization of test cases (116a-116n) impacted by changes (134a-134n) to the codebase (110).

Continuing with FIG. 1, in one or more embodiments, the change processing engine (104) may include a change list analyzer (126), a test sequencer (128), a test executive (130), and a failure analyzer (132). In one or more embodiments, the change list analyzer (126) may include functionality to determine, using the mapping (122), the test cases (116a-116n) impacted by changes (134a-134n) to the codebase (110) specified in the change list (106). In one or more embodiments, the change list analyzer (126) may query the mapping (122) using the files (112a-112n) and lines (114a-114n, 118a-118n) specified in the change list (106) to determine the impacted test cases (116a-116n). In one or more embodiments, the change list analyzer (126) may include functionality to issue alerts based on analyzing the change list (106) in the context of the mapping (124). For example, the change list analyzer (126) may issue an alert identifying lines (114a-114n, 118a-118n) within files (112a-112n) that are not covered by any test case (116a-116n). For example, there may be uncovered lines (114a-114n, 118a-118n) when a new collection of lines (114a-114n, 118a-118n) is added to a file (112a-112n) and there is no test case (116a-116n) covering the new collection of lines (114a-114n, 118a-118n).

In one or more embodiments, the test sequencer (128) may include functionality to prioritize the impacted test cases (116a-116n) based on the mapping (122) and the test results (124) corresponding to each impacted test case (116a-116n). In one or more embodiments, the test sequencer (128) may then send a prioritized list of the impacted test cases (116a-116n) to the test executive (130) for execution. In one or more embodiments, test results (124) are obtained from the database (120), which contains the most recent test results (124) (updated by the test executive (130)), thereby enabling learning from the results of recent test case (116a-116n) execution.

In one or more embodiments, the test executive (130) may include functionality to automate the execution of one or more impacted test cases (116a-116n), based on their respective priorities assigned by the test sequencer (128). In one or more embodiments, the test executive (130) may skip over test cases (116a-116n) that are not in the prioritized list of impacted test cases (116a-116n). The test executive (130) may also skip over test cases (116a-116n) having low priority. The test executive (130) may obtain new test results (124) for each of the executed impacted test cases (116a-116n), and may update the database (120) with the new test results (124). In one or more embodiments, a flag or timestamp associated with the mapping (122) may indicate whether the mapping (122) needs to be updated in the database (120) after executing one or more of the impacted test cases (116a-116n).

In one or more embodiments, the failure analyzer (132) may include functionality to issue alerts based analyzing the collection of test results (124) corresponding to one or more test cases (116a-116n). For example, the failure analyzer (132) may issue an alert identifying test cases (116a-116n) whose failure count exceeds a predetermined number, whose execution time exceeds a predetermined amount, and/or whose resource (e.g., processor or memory) utilization exceeds a predetermined amount. The files (112a-112n) and/or lines (114a-114n, 118a-118n) covered by frequently failing test cases (116a-116n) may represent "edge cases" that are often overlooked by developers, and are therefore error-prone.

While FIG. 1 shows a configuration of components, other configurations may be used without departing from the scope of the invention. For example, various components may be combined to create a single component. As another example, the functionality performed by a single component may be performed by two or more components.

Figure 2:
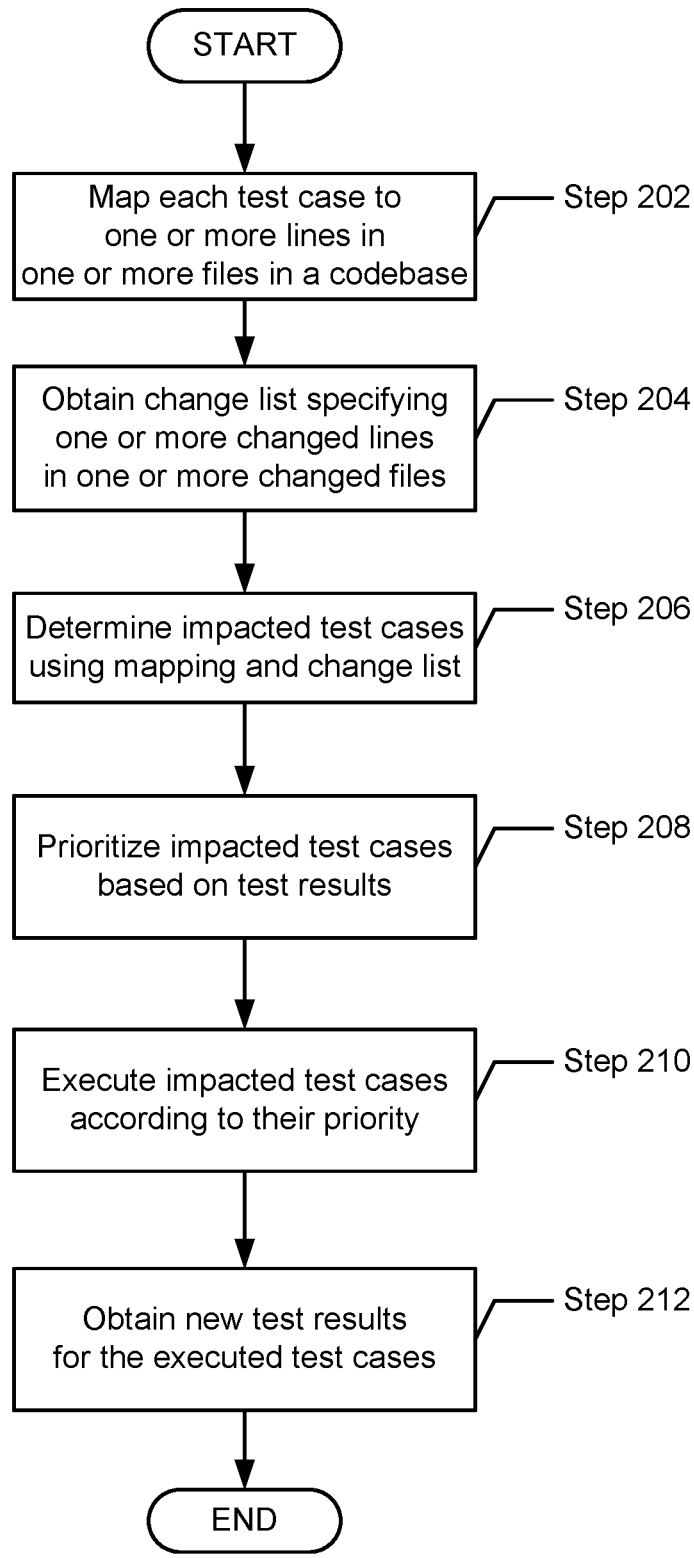
FIG. 2 and FIG. 3 show flowcharts in accordance with one or more embodiments of the invention.
Figure 3:
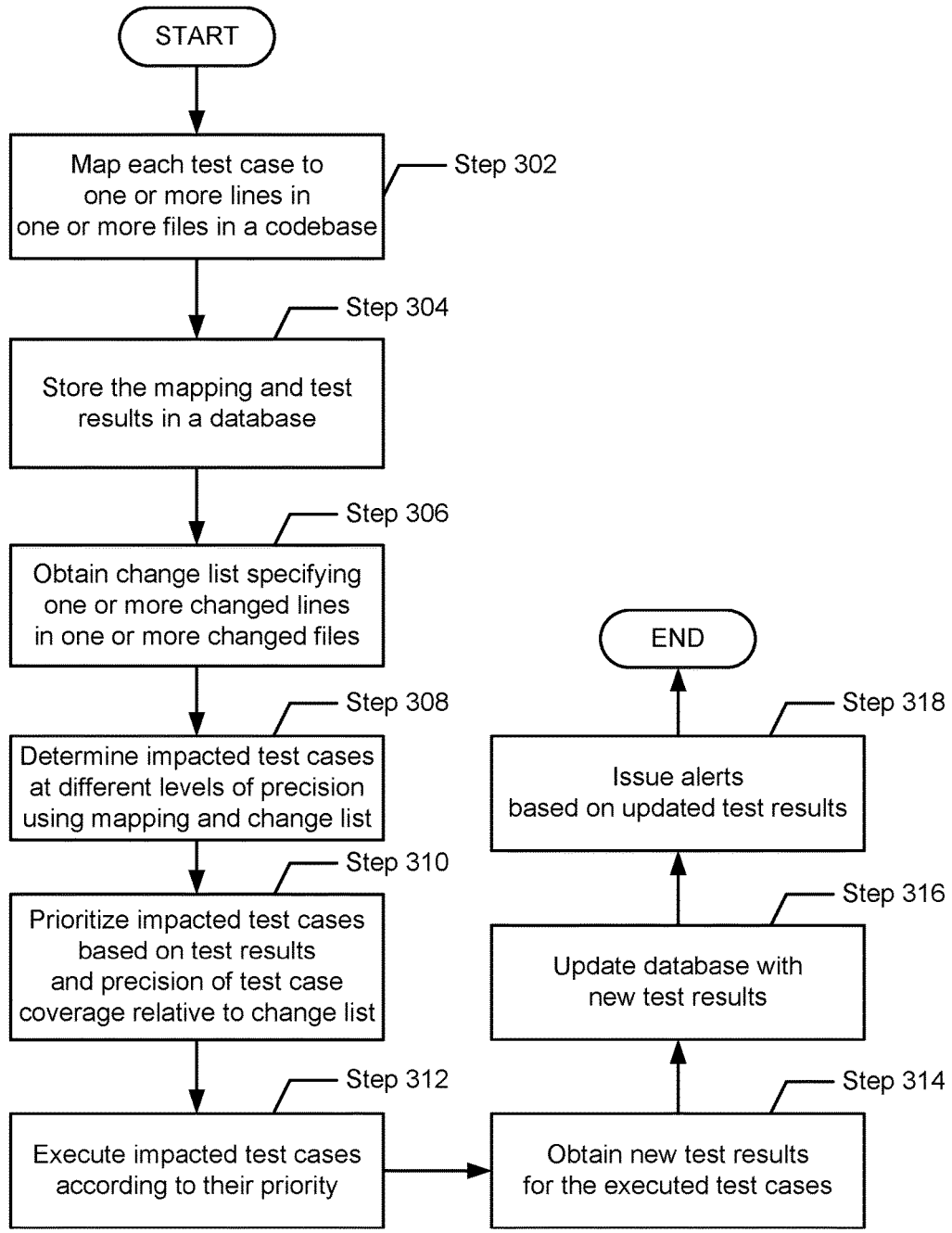

FIG. 2 and FIG. 3 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for automated software testing, in accordance with one or more embodiments. One or more steps in FIG. 2 may be executed by components of the computer system (100) (discussed in reference to FIG. 1).

Initially, in Step 202, a mapping is created that maps each test case to one or more lines in one or more files covered by that test case. In one or more embodiments, the mapping may be generated using information obtained from one or more tools (e.g., code coverage tools) used during debugging and/or instrumenting the codebase.

In Step 204, a change list is obtained specifying one or more lines in one or more files changed in a new version of the codebase. In one or more embodiments, the change list may be received from a version control system that maintains the source code of the codebase.

In Step 206, the test cases impacted by the changes to the codebase are determined. In one or more embodiments, this may be accomplished by querying the mapping to determine the collection of test cases corresponding to each changed line in each changed file in the change list.

In Step 208, the impacted test cases are prioritized using previous test results of each impacted test case. In one or more embodiments, the priorities of the impacted test cases may be based on their coverage. For example, an impacted test case covering multiple changed lines in multiple changed files may have higher priority than an impacted test case covering a single changed line in a single changed file (e.g., because each changed line may represent a potential source of new bugs when the changed line is integrated with other portions of the codebase).

In Step 210, one or more impacted test cases are executed, based on their priorities. In one or more embodiments, there may be a time constraint requiring that test execution complete within a predetermined time interval (e.g., in order to maintain a steady continuous integration software development process) which may require skipping the execution of one or more low priority test cases.

In Step 212, new test results are obtained for the executed test cases. In one or more embodiments, the new test results may include whether the corresponding test passed or failed, and various other test measurements pertaining to the performance of the codebase.

Thus, using embodiments described in FIG. 2, the mapping and the change list are used to automatically drive the identification, prioritization and execution of impacted test cases, where the prioritization is based, in part, on previous test results.

FIG. 3 shows a flowchart describing, in more detail than FIG. 2, the method for automated software testing, in accordance with one or more embodiments of the invention. One or more steps in FIG. 3 may be executed by components of the computer system (100) (discussed in reference to FIG. 1).

In Step 302, a mapping is created that maps each test case to one or more lines in one or more files covered by that test case, as discussed above in the description of Step 202.

In Step 304, the mapping may be stored in a database. In one or more embodiments, the database may also store test results obtained by executing each test case. In one or more embodiments, the test results may include execution time and a failure count indicating the number of times the test case has failed.

In Step 306, a change list is obtained specifying one or more lines in one or more files changed in a new version of the codebase, as discussed above in the description of Step 204.

In Step 308 (similar to Step 206), the test cases impacted by the changes to the codebase are determined. In one or more embodiments, this may be accomplished by querying the mapping to determine the collection of test cases corresponding to each changed line in a file specified in the change list. However, it may be the case that a changed line is not covered by any test case. Therefore, in one or more embodiments, if no test case can be found covering a specific changed line in a file specified in the change list, then the mapping may be queried again using a broader query that only specifies the changed file, without including the changed line. That is, an attempt is made to find test cases that cover the change with less precision), at the file level (e.g., test cases that cover unchanged lines in the changed file, if no test case precisely covers the change at the line level.

In one or more embodiments, an alert may be issued when, due to one or more changes specified in the change list, there may be files and/or lines in files that are uncovered by any test case. For example, the change list may have added new lines and/or new files to the codebase which are not yet covered by a test case.

In Step 310 (similar to Step 208), the impacted test cases are prioritized using the previous test results of each impacted test case. In one or more embodiments, the priority of an impacted test case may be based on predetermined weights assigned to one or more test results, for example, execution time and the failure count. In one or more embodiments, the priorities of the impacted test cases may be based on their precision of coverage, for example, whether the impacted test case has file-level or line-level precision relative to a change in the change list. For example, an impacted test case with line-level precision may have higher priority than an impacted test case with file-level precision.

In one or more embodiments, the priorities of impacted test cases may be computed to favor test cases with quick execution time, and test cases that frequently fail (based on their prior test results). Executing such test cases is therefore likely to quickly detect bugs earlier in the integration cycle than would have been detected otherwise.

In Step 312 (similar to Step 210), one or more impacted test cases are executed, based on their priorities.

In Step 314 (similar to Step 212), new test results are obtained for the executed test cases.

In Step 316, the database is updated with the new test results. The new test results may be considered during future prioritizations of impacted test cases (e.g., in future instances of Step 310), thereby enabling learning from the results of test case execution. In one or more embodiments, depending on the value of a flag, the database may also be updated with an updated mapping, for example, relating to the executed test cases.

In Step 318, one or more alerts may be issued based on the updated test results. In one or more embodiments, an alert may be issued identifying test cases whose failure count exceeds a predetermined number and/or whose execution time exceeds a predetermined amount. For example, a frequently failing test case may indicate a trouble spot in the codebase, and a long-running test case may be a candidate for performance improvements.

Figure 4:
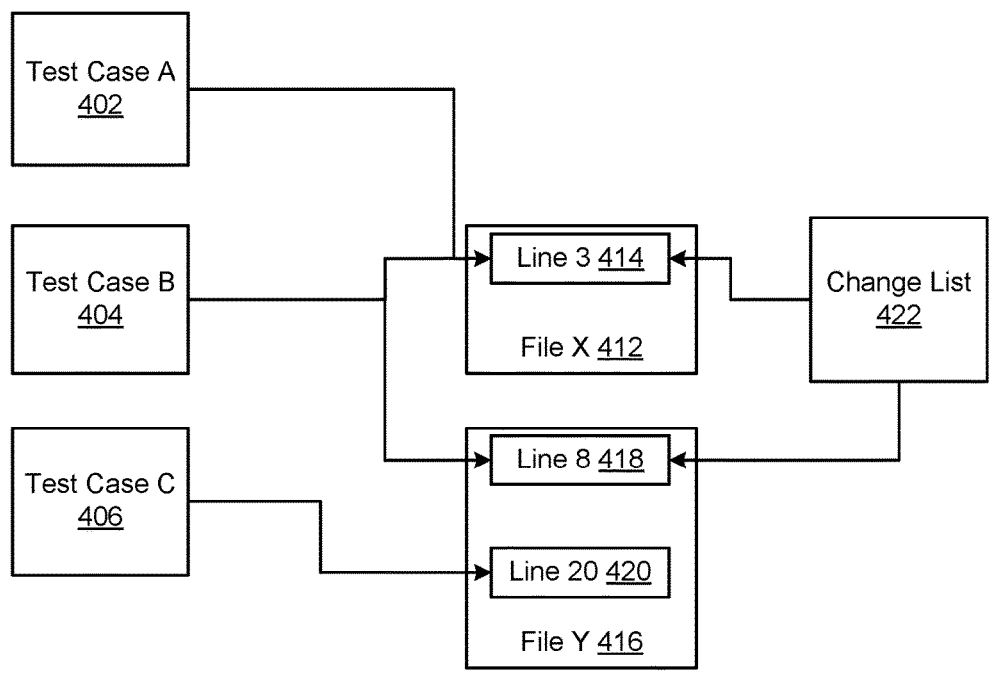
FIG. 4 and FIG. 5 show examples in accordance with one or more embodiments of the invention.

The following example is for explanatory purposes only and not intended to limit the scope of the invention. FIG. 4 illustrates varying precision of coverage relative to the change list. The mappings from both Test Case A (402) and Test Case B (404) to File X (412) have line-level precision covering Line 3 (414) of File X (412). Similarly, the mappings from both Test Case B (404) and Test Case C (406) to File Y (416) also have line-level precision covering Line 8 (418) of File Y (416). However, the mapping from Test Case C (406) to File Y (416) has file-level precision because Test Case C (406) only covers line 20 (420) of File Y (416) which is unchanged within File Y (416).

TABLE 1

Mapping Test Cases With Different Precision of Coverage Relative to a Change List

| Test Case | File | Line |
|---|---|---|
| A | X | 3 |
| B | X | 3 |
| B | Y | 8 |
| C | Y | |

The mapping illustrated in FIG. 4 is shown in tabular form above in Table 1, where each row represents the coverage of a test case (402, 404, 406) in terms of a line (414, 418, 420) in a file (412, 416). The first 3 rows of Table 1 represent the line-level precision of coverage for Test Cases A and B (402, 404) relative to Files X and Y (412, 416) because Test Cases A and B (402, 404) each cover changed lines (414, 418) as indicated by the change list (422). The last row represents the file-level precision of coverage for Test Case C (406) relative to File Y (416), and therefore does not contain a value for a line in File Y (416). This is because Test Case C (406) covers Line 20 (420) in File Y (416), while only Line 8 (418) has been changed, as indicated by the change list (422).

TABLE 2

Change List

| File | Line |
|------|------|
| X    | 3    |
| Y    | 8    |

The change list (422) illustrated in FIG. 4 is shown in tabular form above in Table 2, where each row represents the change in terms of a line (414, 418) in a file (412, 416).

TABLE 3

Test Results

| Test Case | Execution Time | Failure Count |
|-----------|----------------|---------------|
| A         | 100 seconds    | 100           |
| B         | 50 seconds     | 50            |
| C         | 30 seconds     | 25            |

Table 3 above shows test results for Test Case A (402), Test Case B (404) and Test Case C (406) of FIG. 4. All three test cases (402, 404, 406) are impacted by one or more changes in the change list (422). The priorities of Test Case A (402), Test Case B (404) and Test Case C (406) may be based on weights assigned to their corresponding test results. Test Case C (406) may be assigned the lowest priority because it is the only test case whose mapping has file-level precision, whereas Test Case A (402) and Test Case B (404) both have mappings with line-level precision.

In one or more embodiments, various prioritization formulas may be devised to weight the relative importance of various types of test results. As an example of a simple prioritization formula that favors a high failure count, execution time may be assigned a weighting factor of −1 and failure count may be assigned a weighting factor of 3. Then the priority of Test Case A (402) is (−1* 100)+(3*100)=200 and the priority of Test Case B (404) is: (−1* 50)+(3*50)=100. Therefore Test Case A (402) has the higher priority under this formula, due to its high failure count. However, if the prioritization formula had instead favored quick execution time, for example, execution time may be assigned a weighting factor of −3 and failure count may be assigned a weighting factor of 1. Then the priority of Test Case A (402) is (−3*100)+(1*100)=−200 and the priority of Test Case B (404) is: (−3*50)+(1*50)=−100. Therefore Test Case B (404) has the higher priority under this revised formula, due to its quicker execution time.

Figure 5:
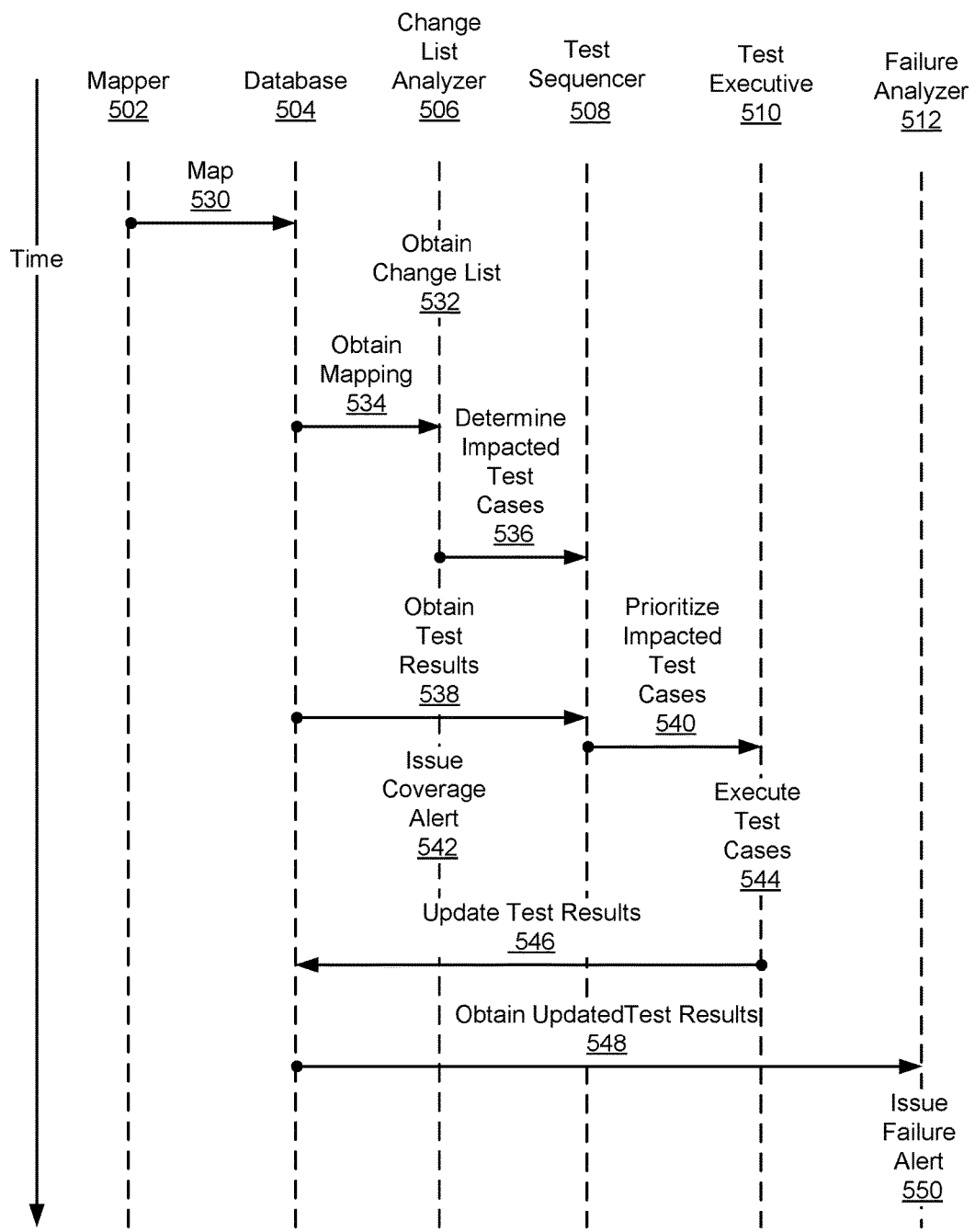

The following example is for explanatory purposes only and not intended to limit the scope of the invention. FIG. 5 illustrates, in accordance with one or more embodiments, the relative timing of steps that may be performed by the mapper (502) ((108) in FIG. 1), the database (504) ((120) in FIG. 1), the change list analyzer (506) ((126) in FIG. 1), the test sequencer (508) ((128) in FIG. 1), the test executive (510) ((130) in FIG. 1), and the failure analyzer (512) ((132) in FIG. 1), in accordance with the flowcharts in FIG. 2 and FIG. 3.

In Step 530, the mapper (502) stores a mapping in the database (504) (e.g., based on information provided by a code coverage tool).

In Step 536, the change list analyzer (506) uses the mapping (obtained in Step 534 from the database (504)), along with a change list obtained (e.g., from a version control system) in Step 532, to determine impacted test cases. The change list analyzer (506) then sends the impacted test cases to the test sequencer (508).

In Step 540, the test sequencer (508) uses the impacted test cases, along with test results obtained from the database (504) in Step 538, to prioritize the impacted test cases. The prioritization may also depend on the precision of coverage of each impacted test case coverage relative to the changes in the change list. The test sequencer (508) sends the prioritization to the test executive (510).

In Step 542, the change analyzer (506) may issue a coverage alert if it discovers a portion (e.g., a line in a file) of the codebase not covered by any test case.

In Step 544, the test executive (510) then executes one or more impacted test cases.

In Step 546, the test executive (510) updates the database (504) with the results of the executed test cases. The updated test results are thus available for use in future prioritizations (in future instances of Step 540).

In Step 548, the failure analyzer (512) obtains the updated test results from the database (504).

In Step 550, the failure analyzer (512) may issue a failure alert if predetermined limits relating to test results (e.g., execution time or failure count) are reached.

Figure 6A:
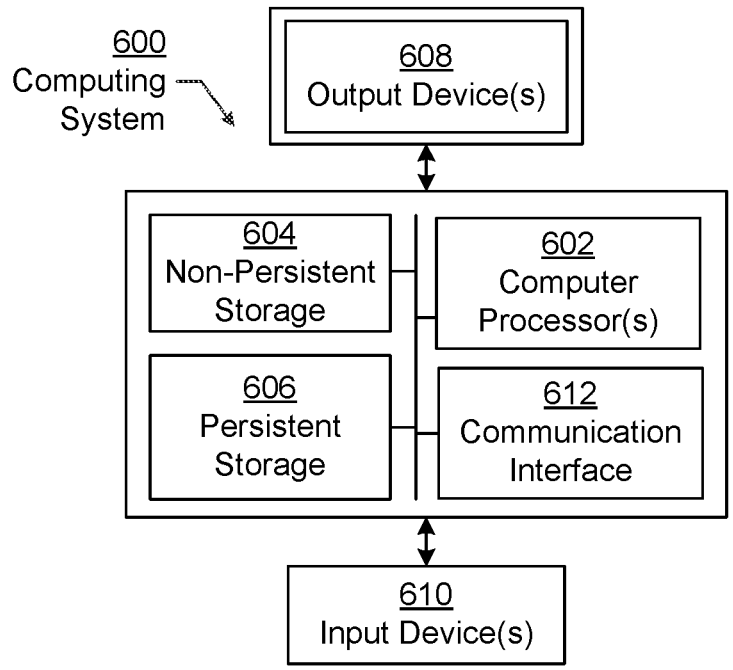
FIG. 6A and FIG. 6B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
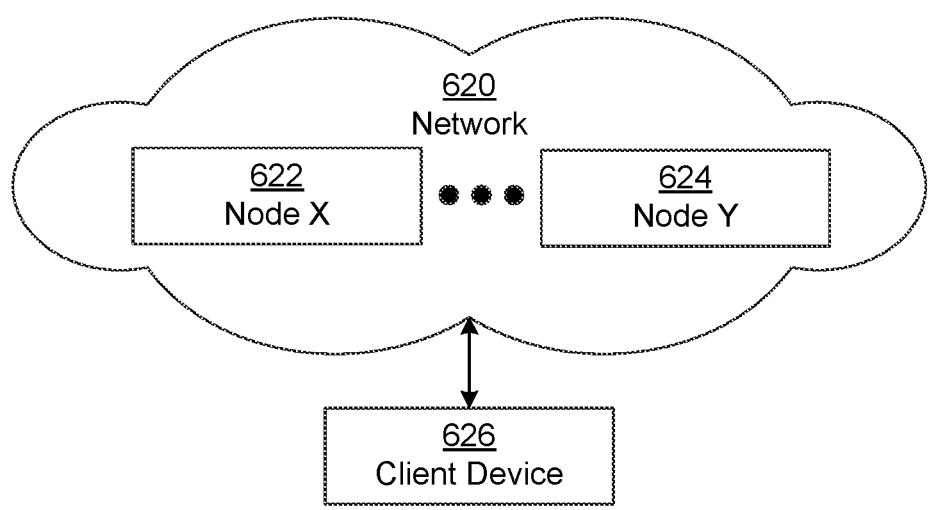

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automated software testing, comprising:
   instrumenting a codebase to extract a plurality of lines in a plurality files that are executed when executing the codebase;
   in response to executing the codebase, mapping a plurality of test cases to the plurality of lines,
      wherein each test case of the plurality of test cases covers one or more lines in the plurality of lines and has a corresponding plurality of test results;
   obtaining a change list comprising one or more changes, each change specifying a changed line in a changed file of the plurality of files;
   determining, based on the mapping and the change list, a plurality of impacted test cases of the plurality of test cases by:
      attempting to identify, for each change of the change list, one of the plurality of test cases that covers the changed line specified by the change;
      failing to identify a test case that covers the changed line specified by a first change of the change list; and
      identifying one of the plurality of test cases that covers an unchanged line in the changed file specified by the first change and fails to cover the changed line;
   prioritizing the plurality of impacted test cases to favor frequently failing test cases based, in part, on a plurality of test results corresponding to each impacted test case of the plurality of impacted test cases,
      wherein the plurality of test results comprises a failure count and a measure of the utilization of a resource of a computer system during execution of the corresponding impacted test case, and
      wherein the prioritization is further based on a first pre-determined weighting factor of the measure of the utilization and a second pre-determined weighting factor of the failure count;
   executing, based on the prioritization, one or more impacted test cases of the plurality of impacted test cases to obtain a plurality of executed test cases; and
   obtaining, for each executed test case of the plurality of executed test cases, a new plurality of test results.

2. The method of claim 1, further comprising:
   storing, in a database, the mapping and a plurality of test results corresponding to each test case of the plurality of test cases; and
   updating, for each executed test case, the database with the new plurality of test results.

3. The method of claim 1,
   wherein each test result of the plurality of test results comprises an execution time, and
   wherein the prioritization is further based on a third pre-determined weighting factor of the execution time.

4. The method of claim 1, wherein the determination is further based on a precision of coverage, relative to a change in the change list, of an impacted test case of the plurality of impacted test cases.

5. The method of claim 1, wherein the prioritization is further based on a precision of coverage, relative to a change in the change list, of an impacted test case of the plurality of impacted test cases.

6. The method of claim 1, further comprising:
issuing an alert identifying one or more lines in one or more files of the plurality of files based on one or more test results corresponding to a test case of the plurality of test cases.

7. A system for automated software testing, comprising:
mapper circuitry configured for: in response to executing a codebase, mapping a plurality of test cases to a plurality of lines in a plurality files in the codebase, wherein each test case of the plurality of test cases covers one or more lines in the plurality of lines and has a corresponding plurality of test results;
change list analyzer circuitry configured for:
obtaining a change list comprising one or more changes, each change specifying a changed line in a changed file of the plurality of files, and
determining, based on the mapping and the change list, a plurality of impacted test cases of the plurality of test cases by:
attempting to identify, for each change of the change list, one of the plurality of test cases that covers the changed line specified by the change
failing to identify a test case that covers the changed line specified by a first change of the change list; and
identifying one of the plurality of test cases that covers an unchanged line in the changed file specified by the first change and fails to cover the changed line;
test sequencer circuitry configured for:
prioritizing the plurality of impacted test cases to favor frequently failing test cases based, in part, on a plurality of test results corresponding to each impacted test case of the plurality of impacted test cases,
wherein the plurality of test results comprises a failure count and a measure of the utilization of a resource of a computer system during execution of the corresponding impacted test case, and
wherein the prioritization is further based on a first pre-determined weighting factor of the measure of the utilization and a second pre-determined weighting factor of the failure count;
test executive circuitry configured for:
instrumenting the codebase to extract the plurality of lines in the plurality files that are executed when executing the codebase;
executing, based on the prioritization, one or more impacted test cases of the plurality of impacted test cases to obtain a plurality of executed test cases, and
obtaining, for each executed test case of the plurality of executed test cases, a new plurality of test results; and
repository circuitry configured for storing at least the codebase and the plurality of test cases.

8. The system of claim 7,
wherein the repository circuitry further comprises a database storing the mapping and a plurality of test results corresponding to each test case of the plurality of test cases, and
wherein the test executive circuitry further comprises updating, for each executed test case, the database with each new plurality of test results.

9. The system of claim 7,
wherein each test result of the plurality of test results comprises a failure count and an execution time, and
wherein the prioritization is further based on a third pre-determined weighting factor of the execution time.

10. The system of claim 7, wherein the determination is further based on a precision of coverage, relative to a change in the change list, of an impacted test case of the plurality of impacted test cases.

11. The system of claim 7, wherein the prioritization is further based on a precision of coverage, relative to a change in the change list, of an impacted test case of the plurality of impacted test cases.

12. The system of claim 7, further comprising:
failure analyzer circuitry configured for issuing an alert identifying one or more lines in one or more files of the plurality of files based on one or more test results corresponding to a test case of the plurality of test cases.

13. A non-transitory computer readable medium comprising instructions that, when executed by a hardware processor, perform a method for automated software testing, the method comprising:
instrumenting a codebase to extract a plurality of lines in a plurality files that are executed when executing the codebase;
in response to executing the codebase, mapping a plurality of test cases to the plurality of lines,
wherein each test case of the plurality of test cases covers one or more lines in the plurality of lines and has a corresponding plurality of test results;
obtaining a change list comprising one or more changes, each change specifying a changed line in a changed file of the plurality of files;
determining, based on the mapping and the change list, a plurality of impacted test cases of the plurality of test cases by:
attempting to identify, for each change of the change list, one of the plurality of test cases that covers the changed line specified by the change;
failing to identify a test case that covers the changed line specified by a first change of the change list; and
identifying one of the plurality of test cases that covers an unchanged line in the changed file specified by the first change and fails to cover the changed line;
prioritizing the plurality of impacted test cases to favor frequently failing test cases based, in part, on a plurality of test results corresponding to each impacted test case of the plurality of impacted test cases,
wherein the plurality of test results comprises a failure count and a measure of the utilization of a resource of a computer system during execution of the corresponding impacted test case, and
wherein the prioritization is further based on a first pre-determined weighting factor of the measure of the utilization and a second pre-determined weighting factor of the failure count;
executing, based on the prioritization, one or more impacted test cases of the plurality of impacted test cases to obtain a plurality of executed test cases; and
obtaining, for each executed test case of the plurality of executed test cases, a new plurality of test results.

14. The non-transitory computer readable medium of claim 13, wherein the method further comprises:
storing, in a database, the mapping and a plurality of test results corresponding to each test case of the plurality of test cases; and
updating, for each executed test case, the database with the new plurality of test results.

15. The non-transitory computer readable medium of claim 13,
   wherein each test result of the plurality of test results comprises a failure count and an execution time, and
   wherein the prioritization is further based on a third pre-determined weighting factor of the execution time.

16. The non-transitory computer readable medium of claim 13, wherein the determination is further based on a precision of coverage, relative to a change in the change list, of an impacted test case of the plurality of impacted test cases.

17. The non-transitory computer readable medium of claim 13,
   wherein the prioritization is further based on a precision of coverage, relative to a change in the change list, of an impacted test case of the plurality of impacted test cases, and a scope of a change in the change list.

18. The non-transitory computer readable medium of claim 13, wherein the method further comprises:
   issuing an alert identifying one or more lines in one or more files of the plurality of files based on one or more test results corresponding to a test case of the plurality of test cases.

\* \* \* \* \*